Figure 6:
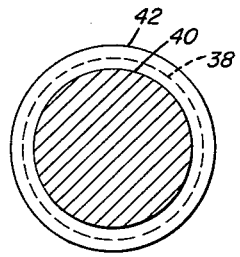

April 27, 1965        R. H. CARLSON        3,180,126
SELF-TAPPING SCREW AND METHOD OF MANUFACTURE
Filed Nov. 14, 1962        2 Sheets-Sheet 1
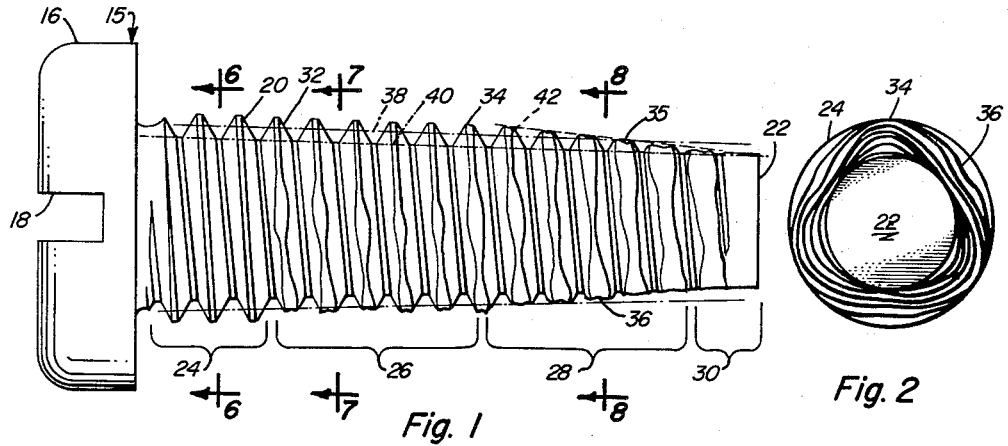
Fig. 1
Fig. 2
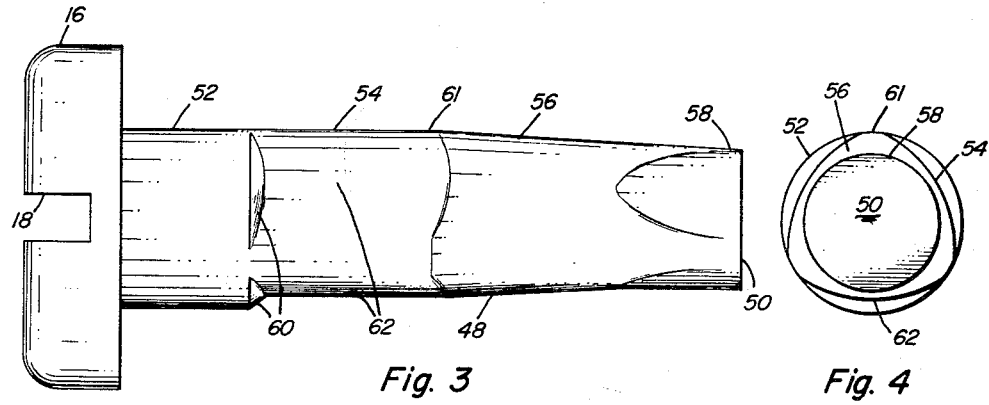
Fig. 3
Fig. 4
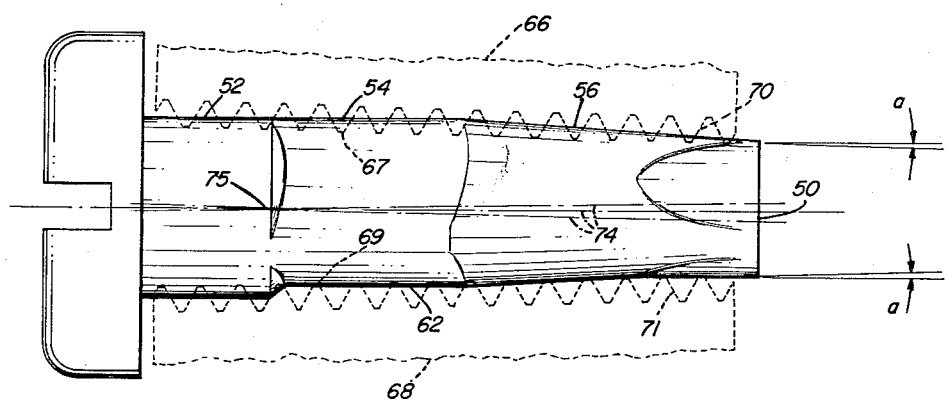
Fig. 5
INVENTOR.
RAYMOND H. CARLSON
BY
BUCKHORN, BLORE, KLARQUIST & SPARKMAN
ATTORNEYS April 27, 1965 R. H. CARLSON 3,180,126
SELF-TAPPING SCREW AND METHOD OF MANUFACTURE
Filed Nov. 14, 1962 2 Sheets-Sheet 2

INVENTOR.
RAYMOND H. CARLSON
BY
BUCKHORN, BLORE, KLARQUIST & SPARKMAN
ATTORNEYS

United States Patent Office 3,180,126
Patented Apr. 27, 1965

3,180,126
SELF-TAPPING SCREW AND METHOD OF MANUFACTURE
Raymond H. Carlson, Rockford, Ill., assignor to Textron Industries, Inc., Rockford, Ill., a corporation of Delaware
Filed Nov. 14, 1962, Ser. No. 237,517
2 Claims. (Cl. 72—365)

The present invention relates to an improved self-tapping screw, and more particularly to a self-tapping screw especially suited for use in thin bodies and a method of manufacturing the same.

Recently, self-tapping screws having threaded shank portions of arcuate, triangular cross section have been introduced on the market, to which screws are attributed the advantages of chipless thread-forming and very low driving torque as compared with more conventional self-tapping screws of circular cross section. However, because the entire threaded length of such screws is arcuate triangular in shape, they often times do not exhibit as high a stripping strength as is desirable, when driven into thin sections such as sheet metal.

One of the primary objects of the present invention, therefore, is to provide a new and improved thread-forming screw requiring a minimum driving torque and having a maximum stripping strength in thin members. To this end the screw has a tapered, thread-forming portion of arcuate, polygonal shape similar to that of other recently introduced screws, and a holding portion of circular shape as in conventional screws, the thread-forming portion being longer than that of other self-tapping screws and longer than its own holding portion.

A further object of the invention is to provide a new and improved self-tapping screw having, in addition to a circular holding portion and an arcuate polygonal thread-forming portion, an intermediate arcuate polgonal sizing portion, both such holding and sizing portions having a slightly tapering thread formation to provide a close fit and, therefore, maximum thread engagement in a fastened assembly.

Another object of the present invention is to provide a self-tapping screw having in addition to a short, round holding portion and a long, tapered, lobular thread-forming portion, a short, round, substantially unthreaded pilot section extending forwardly of such thread-forming portion to facilitate, especially in difficult to reach locations, alignment and starting of the screw in a pilot hole.

Although the advantages of providing in certain instances a self-tapping screw with both circular and non-circular threaded sections have previously been recognized, the manufacturing problems involved have heretofore prevented the successful making of such a screw on a commercial scale. To cut or grind threads on a screw shank of varying configuration is too costly. On the other hand, until now it has been thought impossible to roll an accurate, continuous thread on a screw blank of variable cross section, at least without the use of specially contoured, and therefore expensive dies.

It is, therefore, another object of the invention to provide a new and economical method of roll-threading a screw blank having both round and lobular portions by the use of conventional, flat or arcuate dies. Briefly, the method involves the application of rolling pressure constituting a series of pressure ridges, to opposite sides of a screw blank having a short, round cylindrical section and a relatively long, arcuate polygonal section, at least a part of which is tapered, the radial distance between the peripheral points of application of such pressure ridges and the blank axis decreasing gradually and uniformly in a direction toward the work-entering end of such blank, and while applying such pressure so as to cause the blank to rotate, permitting the blank axis to oscillate about a fulcrum point at the junction of the round and lobular blank sections, so as to generate on such blank a continuous, helical thread having substantially circular pitch cone cross sections on the circular blank portion, and generally arcuate polygonal pitch cone cross sections on the tapered, lobular blank portion.

The foregoing and other objects and advantages will be more readily ascertained from inspection of the following specification taken in connection with the accompanying drawing wherein like numerals refer to like parts throughout, while the features of novelty will be more distinctly pointed out in the appended claims.

Figure 7:
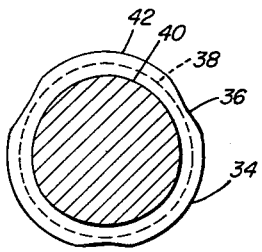
Figure 8:
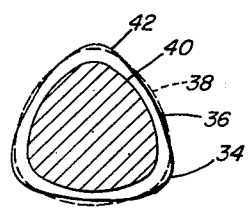
Figure 9:
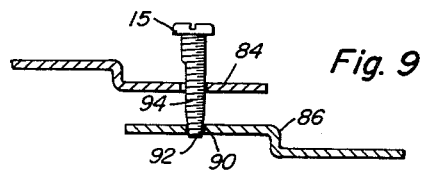
Figure 10:
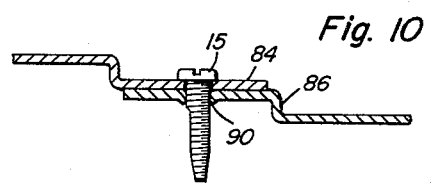
Figure 11:
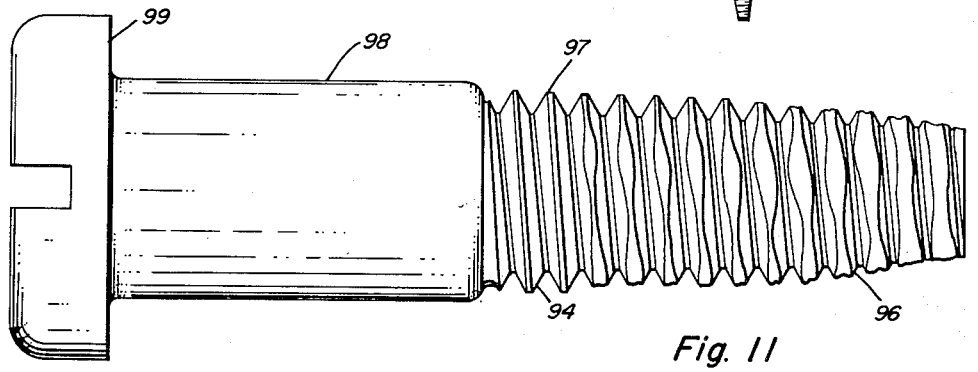
Figure 12:
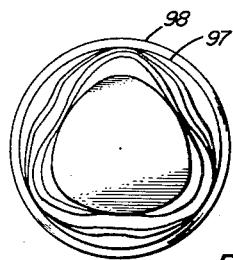

In the drawings:
FIG. 1 is a side view of a screw embodying the present invention;
FIG. 2 is a work-entering end view of the screw of FIG. 1;
FIG. 3 is a side view of a blank for making the screw of FIG. 1;
FIG. 4 is a work-entering end view of the blank of FIG. 3;
FIG. 5 is a partially schematic view of the blank of FIG. 3 between a pair of flat, thread-rolling dies;
FIG. 6 is a somewhat schematic cross section taken along the line 6—6 of FIG. 1;
FIG. 7 is a somewhat schematic cross section taken along the line 7—7 of FIG. 1;
FIG. 8 is a somewhat schematic cross section taken along the line 8—8 of FIG. 1;
FIG. 9 is a view, partly in section, of a screw of the invention partially installed in an assembly;
FIG. 10 is a view similar to FIG. 9 showing the screw fully seated in an assembly;
FIGS. 11 and 12 are side and end views, respectively, of a screw modification embodying the present invention.

In this application the folowing definitions shall be applicable:

"Cylinder" is used in the broad sense to mean a solid of uniform cross section generated by a straight line moving around a closed curve and remaining parallel to a fixed straight line.

"Cone" is used in the broad sense to mean a solid generated by a straight line, one end of which remains fixed while the other end moves around a closed curve.

"Pitch cylinder" is, on a straight thread, an imaginary coaxial cylinder, the surface of which would pass through the thread profiles or the projections thereof at such points as to make the width of the groove between threads, or the projection thereof, equal to one-half the basic pitch.

"Pitch cone" is, on a taper thread, an imaginary coaxial cone, the surface of which would pass through the thread profiles, or the projections thereof, at such points as to make the width of the groove between threads, or the projection thereof, equal to one-half the basic pitch. See, for example, the pitch cone indicated in dashed lines 38 in FIG. 1.

"Pitch diameter" is used as a generic term to designate the diameter of any section of either the "pitch cylinder" or the "pitch cone" as determined by the three-wire method of pitch diameter measurement.

"Pitch diameter cross section" is a cross section through either a pitch cylinder or a pitch cone.

"Root cylinder" is, on a straight thread, an imaginary coaxial cylinder, the surface of which would bound the root of an external thread.

"Root cone" is, on a taper thread, an imaginary coaxial cone, the surface of which would bound the root of an external thread.

"Root diameter" is the diameter of any cross section of the "root cone," being the perpendicular distance between two parallel lines, each of which is a tangent to the periphery of the same root cone cross section.

"Crest cylinder" is, on a straight thread, an imaginary coaxial cylinder, the surface of which would bound the crest of an external thread.

"Crest cone" is, on a taper thread, an imaginary coaxial cone, the surface of which would bound the crest of an external thread.

"Crest diameter" is the diameter of any cross section of the "crest cone," being the perpendicular distance between two parallel lines, each of which is a tangent to the periphery of the same crest cone cross section.

The three-wire method of pitch diameter measurement is well known in the art and is described in the United States National Bureau of Standards Handbook No. H28 (1957).

With reference to FIGS. 1 and 2, the screw 15 illustrated therein has a driving means at one end including an enlarged head 16 and a driver receiving recess 18. An elongate roll-threaded shank 20 extends from the head 16 to a work-entering end 22. The threaded shank includes a short, generally cylindrical holding portion 24 of circular cross section nearest the head 16, a generally cylindrical sizing portion 26 arcuate triangular in cross section next adjacent the holding portion, and an unusually long, tapered thread-forming portion 28 also of arcuate triangular cross section extending from the sizing portion 26 in a direction toward the work-entering end 22. A short, pilot portion 30 of circular cross section extends from the thread-forming portion to the work-entering end.

Although preferably arcuate triangular in cross-section, the thread-forming and sizing portions, 28 and 26, may be five or seven sided in the larger screw sizes. In any event, the cross sections of the root and pitch cylinders or cones as the case may be in such portions include an odd number of arcuate lobes 34 and generally arcuate sides 36 between such lobes, an odd number because the blank portion from which the corresponding screw portion is formed is odd-sided in order that the blank may be rolled smoothly between conventional flat or arcuate thread-rolling dies. The cross sections through the thread crests, or crest cone 42, of the thread formation in such lobular portions may deviate slightly from a true arcuate triangular shape, as shown in FIGS. 2, 7 and 8 because the threads along the sides 36 in the sizing portion and on both the lobes 34 and sides 36 in the thread-forming portion, are incomplete, that is, the thread crests in such areas are not fully formed.

Nevertheless, the thread formation 32 on the shank is continuous and extends from the holding portion 24 through the thread-forming portion 28. The pilot portion 30, however, is substantially unthreaded and has a diameter less than the minimum pitch diameter of the screw in order that it may be freely inserted into a pilot hole without engaging the sidewalls thereof. When so inserted, the pilot portion accurately aligns the screw in the pilot hole and helps to hold the screw therein until it can be driven. Although the pilot portion may be omitted if desired, it is particularly useful in locations where the screw cannot be aligned by sight.

The tapered thread-forming portion 28, as its name implies, does most of the work of swaging internal threads in the walls of a pilot hole into which the screw is driven. The screw has a very low driving torque because only the arcuate threaded lobes 34 of such portion engage the walls of the pilot hole as the screw is driven. The thread-forming portion 28 is unusually long compared with other self-tapping screws, and in fact exceeds the length of the holding portion 24. The threads on the lobes 34 in such portion 28, are gradually and uniformly tapered, the taper in this instance resulting from the thread crests 35 on such lobes becoming progressively less fully developed in a direction toward the work-entering end 22 so that the thread height diminishes toward the same end. The screw shown has about seven tapered threads on the thread-forming portion, as compared to the usual two or three tapered threads on other self-tapping screws. The greater number of tapered threads in the present screw results in a more gradual working of the parent metal into mating threads and thereby lessens the chances of cutting chips as such mating threads are formed. The greater number of tapered threads also further reduces driving torque in thin bodies because each lobe of such threads will perform less work of thread-forming and the leading part of the thread-forming portion will extend through the body when the trailing part thereof is forming threads.

The sizing portion 26 has fully developed thread crests in the vicinity of the midportion of the lobes 34, although the threads along the sides 36 in such portion, like those of the thread-forming portion, are irregular and incomplete. The complete threads size, or bring to final shape, the internal threads formed by the thread-forming portion.

The holding portion 24 has closely spaced, full threads throughout at least two or three continuous thread convolutions so as to engage as many threads as possible in a parent member whose thickness does not exceed the length of such holding portion. Because the holding portion has circular root, pitch and crest cylinder cross sections, the threads on such portion also engage the mating threads of the parent member throughout 360°, thereby to develop the maximum stripping strength possible in a thin member.

Although in most instances, the provision of the intermediate, lobular sizing portion is preferable, in certain instances it may be desirable to omit such portion altogether, and to extend the tapered, thread-forming portion to the holding portion, in which case the length of the thread-forming portion would be at least several times greater than that of the holding portion.

While the threads in the holding and sizing portions 24 and 26 may be considered generally to define root, pitch and crest cylinders as previously mentioned, each such portion, and in fact the entire threaded shank, actually has a very slight taper, being about 2° in the screw of FIG. 1, in a direction toward the work-entering end, which taper is hardly noticeable unless the screw is viewed under magnification. The thread formation in reality describes, therefore, a pitch cone 38 and a root cone 40, both of which diminish uniformly in diameter in a direction toward the work-entering end 22 at about the same rate which is less than the rate of decrease in the diameter of the crest cone 42 in the holding portion 28 toward the same end. The angle of taper of the root and pitch cones is determined by the angle of inclination of the thread-rolling dies when the threads are formed, but in any event such angle is considerably less than the more obvious angle of taper, here about 5°, described by the crests, or crest cone 42, of the threads in the thread-forming portion 28. Because of such overall root and pitch cone taper, the threads in both the sizing and holding portions do some, although a very small amount, of thread sizing, so that a slight prevailing driving torque is required as the screw is driven even after the thread-forming portion has passed through the work. The resulting snug fit between the screw threads in the holding portion 24 and the mating internal threads also contributes to the development of maximum possible stripping strength.

Referring to FIG. 3, the blank from which the screw of FIG. 1 is formed includes the head portion 16 and a shank 48 extending from the head to a work-entering end 50. The shank is divided into three distinct sections. Adjacent the head 16 is a first, cylindrical section 52 of circular cross section corresponding to and of about the same length as, the holding portion 24 of the screw. A second cylindrical section 54 of arcuate triangular cross section is adjacent the first section, and a third, tapered section 56, also of arcuate triangular cross section, extends from the second section 54 to a short, round pilot section 58 at the work-entering end 50 of the blank. A very short, sharply sloping transition section 60 joins the circular first section 52 and the lobular second section 54 in the vicinity of the arcuate sides 62 of the latter, thus permitting threads to be rolled smoothly and continuously over both major sections despite the difference in cross sectional shape between such sections.

The second and third sections 54 and 56 of the blank in cross section are of substantially the same shape as and correspond to, the sizing and thread-forming portions 26 and 28 of the screw, respectively, as will be evident from a comparison of FIGS. 2 and 4. That is, the arcuate triangular blank sections include arcuate lobes 61 separated by the intermediate arcuate sides 62. The lobes 61 throughout the intermediate section 54 extend radially outwardly from the axis of the blank to the outline of the circular section 52. Referring to FIG. 4, rather than coming to a point at their outer extremities, the lobes 61 are flattened or slightly arcuate to prevent excessive die penetration at such points deforming the lobes to a level below that of the circular blank section 52. The arcuate polygonal sections of the blank also have a uniform rolling diameter, or a constant width as determined by a micrometer, throughout 360°, which enables the noncircular as well as the circular blank portions to rotate smoothly between flat or other conventional dies.

To achieve a uniform rolling diameter, the arcuate sides 62 of the noncircular blank portions have a radius of curvature appreciably greater than one-half the width of the blank in any cross section, but preferably no greater than the full width of the cross section.

For an 8-32 NC screw of the form shown in FIG. 1 the following blank dimensions, with reference to FIG. 3, are exemplary. The shank has a total length of $21/64$ or 0.328 inch. The circular first section is about 0.100" long, or less than one-third the total length of the shank. The lobular second section 54 is about .108" long, and the tapered third section 56 is about .120" long for a combined length greater than twice that of the holding portion. The tapered section also has an angle of taper with respect to the screw axis of about 5°. The transition section tapers at an angle of 20° with respect to the same axis. The diameter of the round section 52 is 0.148", and the diameter of a circle circumscribing the arcuate triangular second section 54 is the same. The radial relief measured from the periphery of the round section to the midpoint of the side 62 of the intermediate section 54 is 0.009". The radius of curvature of the sides in both the tapered third and cylindrical second sections is 0.1045". The width across the lobe extremities is 0.030".

Threads are rolled on the blank according to the method illustrated in FIG. 5, which shows diagrammatically a cross section through a pair of mated thread-rolling dies 66 and 68. The dies have generally flat, but ridged, opposed die faces 67 and 69 extending in both the transverse die direction shown and in a longitudinal die direction although the die faces may be uniformly curved in the longitudinal die direction if desired. That is, each of the pair of dies is an ordinary flat or arcuate thread-rolling die having thread-forming ridges shaped and arranged on the die faces in the usual manner, which is well-known in the art.

The screw blank, such as that of FIG. 3 is inserted between the pair of dies, also in the usual manner, so that the blank lies across the die faces in a transverse die direction. The dies are substantially uniformly spaced apart in the direction of movement of one die with respect to the other, or in the longitudinal die direction, to the same extent as would be the case in rolling round screw blanks between the same dies. However, in a transverse die direction, the opposed die faces are inclined at a small angle $a$, with respect to the axis of the screw blank, about 2° in FIG. 4, toward one another, and toward the work-entering end of the blank. This angle will vary, of course, depending on the relative lengths of the blank sections, but such angle remains constant throughout the thread-forming stroke. In this respect, the angle of die inclination should be such that, at the end of the thread-rolling stroke, as shown the die ridges 70 and 71 will have penetrated the lobes 61 at the leading end of the tapered blank section 56 a small amount to form a starting thread, and also will have penetrated the circular blank section 52 to a depth of about one-half the depth of the die ridges to form full threads in such section.

Of course, since the die faces are flat in a transverse die direction, there are portions of the blank wherein the threads are only partially formed, but such incomplete threads do not interfere with the holding function or the thread-forming of the screw. However, because the dies are inclined it is important that the circular blank section 52 be short, preferably less than one-half the combined lengths of the arcuate triangular sections 54 and 56, in order that full threads may be formed throughout substantially the entire length of the circular section.

As the blank rotates between the dies, its orientation changes with respect to each die face because of the tendency of the blank axis 74 in the lobular blank sections alternately to approach and recede from each die face as first an arcuate side 62 and then a lobe 61 rolls over the face. On the other hand, the tendency of the same axis 74 in the circular blank section 52 as the blank rotates is to remain a constant distance from each die face. The result is that as it rolls the blank, and therefore the blank axis 74, oscillates about a fulcrum point 75 somewhere in the vicinity of the juncture between the circular blank section 52 and the lobular blank section 54. Because the circular section is short and lies closely adjacent the fulcrum point 75 in comparison to a large proportion of the lobular sections 54 and 56, the maximum extent of the oscillation of the axis 74 in the circular section is slight, as shown, and the threads formed on such section therefore have substantially circular pitch and root cone cross sections 38 and 40 as shown in FIG. 6. The pitch and root cones 38 and 40 of the same thread formation in the tapered section 56, however, have well defined arcuate triangular cross sections as shown in FIG. 8 inasmuch as the oscillation of the axis 74 in such section is considerable. As the pitch and root cones 38 and 40 of the thread formation in the lobular blank sections, and especially in the intermediate section 54, approach the fulcrum point 75, the cross sections thereof will become progressively more circular in shape as they gradually merge with those of circular cross section, as shown in FIG. 7. Although the crest, pitch and root cone cross sections of the thread formation will vary in the extent to which they approximate a true circle in any portion of the resulting screw, the basic size and form of the threads in all portions remain constant.

In summary then, the method involves the application of rolling pressure to opposite sides of a screw blank having a short circular shank portion, and a long, lobular shank portion at least a part of which nearest the work-entering end of the blank is tapered. The rolling pressure is applied to such shank portions at a series of uniformly spaced apart areas of maximum pressure, hereafter denoted pressure ridges, because pressure at such areas is applied along a generally V-shaped boundary which is complementary in shape to the cross sectional shape of the screw thread being formed. In practice, the ridges of rolling pressure are applied by means of, for example, the series of generally parallel V-shaped die ridges 70 and 71 on the opposed faces of the dies 66 and 68 in the previously described manner. The radial distance between such pressure ridges and the axis of the blank decreases gradually and uniformly in a direction toward the work-entering end of such blank, so that in an axial plane through the blank, such ridges on each side of the blank lie along an imaginary straight line which is inclined at a small angle $a$ with respect to the axis of the blank and in a direction toward the work-entering end thereof. Such angle of inclination is no greater, and usually is considerably less, than the angle of taper of the lobular portion of the blank with respect to the same axis.

As such pressure is applied, the axis of the blank is permitted to oscillate as previously described between opposed pressure ridges so that a continuous helical thread, also as previously described, is generated on both the circular and lobular blank portions.

Following the rolling of threads on the blank, the resulting screw is hardened by any of a number of appropriate techniques which are well-known in the art.

FIG. 9 shows the screw 15 of the invention partially inserted in an assembly. The assembly includes an inner member 84, and an outer member 86, both of which are relatively thin section as compared with the length of the screw 15. This assembly is one that would be typical in, for example, securing a guide lamp to an automobile body. The pilot hole 90 in the outer member 86 is just large enough to receive the round pilot portion 30 of the screw. As the screw 15 is driven into the member 86, the lobes of the thread-forming portion 28 of such screw penetrate progressively more deeply into the walls of the pilot hole 90 to form mating internal threads therein. Referring to FIG. 10, when the screw is driven home the two members 84 and 86 are drawn together so that the entire thickness of the threaded member 86 is engaged by the circular holding portion of the screw. The portion of the threaded member 86 adjacent the pilot hole 90 may also be turned slightly outwardly as shown, by the axial force exerted by the screw shank whereby internal threads are formed on what was initially the inner surface of the threaded member 86. This provides an effective threaded area greater than the original thickness of the outer member.

With reference to FIGS. 11 and 12, a modified screw embodying the present invention is shown having a round, slightly enlarged unthreaded shank section 98 between the circular threaded section 97 and the driving head 99. This modification is especially useful in assemblies wherein the inner or unthreaded member of the assembly nearest the head of the screw is considerably thicker than the outer or threaded member, wherein the unthreaded shank 98 acts as a spacer to enable the threaded member to be engaged by the circular, threaded holding portion 94 of the screw. It will also be noted that in this modification, the circular pilot section has been omitted so that the thread-forming portion 96 extends to the work-entering extremity of the screw.

Having illustrated and described a preferred embodiment of the invention, it should be apparent to those skilled in the art that the invention permits of modification in arrangement and detail. I claim as my invention all such modifications as come within the true spirit and scope of the following claims.

I claim:
1. A method of making a self-tapping screw having a roll-threaded shank, including a short, circular threaded portion adjacent the head end of said shank, and a long, tapered, lobular threaded portion adjacent the work-entering extremity thereof, said method including the steps:

(a) providing a headed blank having a short cylindrical shank section of circular cross section, and a lobular shank section of uniform width throughout 360° and of greater length than said cylindrical shank section, at least a portion of said lobular shank section being tapered, said lobular shank section extending from said cylindrical shank section to the work-entering end of said blank, (b) then applying rolling pressure to opposite sides of said blank at a plurality of pressure ridges positioned at uniformly spaced apart locations along the length of the blank portion to be threaded, the radial distance between the axis of said blank and the point of application of said pressure ridges on the periphery of said blank gradually and uniformly decreasing in a direction toward the work-entering end thereof, (c) and while continuously applying said rolling pressure as aforesaid so as to cause said blank to rotate, permitting the axis of said blank to oscillate between opposed pressure ridges and about a fulcrum point on said axis in the vicinity of the juncture of the circular and lobular blank sections, (d) and continuing to apply said rolling pressure as aforesaid so as to generate on said circular and lobular blank sections a continuous helical thread, the thread on said circular blank section being substantially fully developed throughout at least a plurality of thread convolutions and having circular pitch cone cross sections, and the thread on said lobular section having arcuate polygonal pitch cone cross sections, but which, in a direction toward said circular section, become progressively more circular so that the pitch cone in said lobular section merges smoothly and gradually with the pitch cone in said circular section.

2. A method of making a self-tapping screw according to claim 1 wherein the blank has a pilot section extending from said lobular shank section to said work-entering end, said pilot section being of circular cross sections of lesser maximum diameter than the maximum width of said lobular blank section, and maintaining said pilot section substantially free of the application of said rolling pressure as said blank rotates, so that said pilot section is substantially unthreaded in the finished screw.

References Cited by the Examiner
UNITED STATES PATENTS

| | | | |
|---|---|---|---|
| 1,832,167 | 11/31 | Wilcox | 10—10 |
| 1,912,517 | 6/33 | DeLapotterie | 10—152 |
| 2,017,341 | 10/35 | Cummins | 10—27.1 |
| 2,167,559 | 7/39 | Upson | 85—46 |
| 2,263,424 | 11/41 | Langer | 85—48 |
| 2,314,391 | 3/43 | DeVellier | 10—10 |
| 2,352,982 | 7/44 | Tomalis | 10—152 |
| 2,562,516 | 7/51 | Williams | 80—61 |
| 2,679,774 | 6/54 | MacDonald | 80—61 |
| 2,807,813 | 10/57 | Welles | 10—152 |
| 2,846,056 | 8/58 | Hampton | 10—27.1 |

FOREIGN PATENTS 4,271   12/74   Great Britain.

MICHAEL V. BRINDISI, Primary Examiner.
EDWARD C. ALLEN, Examiner.